United States Patent
Connolly

(10) Patent No.: US 8,186,716 B2
(45) Date of Patent: May 29, 2012

(54) MODULAR WEIGHT SYSTEMS FOR AUTOMOBILES

(76) Inventor: Michael R. Connolly, Longmont, CO (US)

(*) Notice: Subject to any disclaimer, the term of this patent is extended or adjusted under 35 U.S.C. 154(b) by 139 days.

(21) Appl. No.: 12/013,945

(22) Filed: Jan. 14, 2008

(65) Prior Publication Data

US 2008/0197615 A1    Aug. 21, 2008

Related U.S. Application Data

(60) Provisional application No. 60/885,088, filed on Jan. 16, 2007.

(51) Int. Cl.
    *B60S 9/00*  (2006.01)
(52) U.S. Cl. .......................................... 280/759
(58) Field of Classification Search .................. 280/735, 280/759
    See application file for complete search history.

(56) References Cited

U.S. PATENT DOCUMENTS

| | | | | |
|---|---|---|---|---|
| 1,581,345 A * | 4/1926 | Healy | | 404/32 |
| 3,992,835 A * | 11/1976 | Saveker | | 52/220.2 |
| 4,339,142 A * | 7/1982 | Tanner et al. | | 280/759 |
| 4,902,038 A * | 2/1990 | Grover | | 280/759 |
| 4,971,356 A * | 11/1990 | Cook | | 280/759 |
| 5,028,068 A * | 7/1991 | Donovan | | 280/618 |
| 5,070,415 A * | 12/1991 | Matsumoto | | 358/482 |
| 5,080,418 A * | 1/1992 | Semple et al. | | 296/39.2 |
| 5,172,953 A * | 12/1992 | Chamberlain | | 296/39.2 |
| 5,330,227 A * | 7/1994 | Anderson | | 280/759 |
| 5,494,315 A | 2/1996 | Heltenburg | | |
| 5,511,848 A | 4/1996 | Mobley | | |
| 6,065,632 A * | 5/2000 | Moore, Jr. | | 220/483 |
| 6,079,741 A | 6/2000 | Maver | | |
| 6,193,260 B1 * | 2/2001 | Homan et al. | | 280/515 |
| 6,283,527 B1 * | 9/2001 | Desmarais | | 296/39.2 |
| 6,431,629 B1 * | 8/2002 | Emery | | 296/39.2 |
| 6,716,504 B2 * | 4/2004 | Song | | 428/40.1 |
| 7,159,902 B2 | 1/2007 | Carty | | |
| 7,264,273 B2 * | 9/2007 | Ryan et al. | | 280/759 |
| 7,281,737 B2 * | 10/2007 | Ellis | | 280/759 |
| 7,607,692 B2 * | 10/2009 | Adams et al. | | 280/759 |
| 7,616,224 B2 * | 11/2009 | Kaneko | | 347/224 |
| 2003/0047928 A1 * | 3/2003 | Gosselin | | 280/759 |
| 2004/0247884 A1 * | 12/2004 | Keeney et al. | | 428/421 |
| 2005/0056655 A1 * | 3/2005 | Gary | | 220/737 |
| 2006/0222868 A1 * | 10/2006 | Mori | | 428/447 |
| 2006/0270806 A1 * | 11/2006 | Hale | | 525/439 |
| 2007/0046011 A1 * | 3/2007 | Bovy | | 280/759 |
| 2008/0197614 A1 * | 8/2008 | Connors et al. | | 280/759 |
| 2008/0197615 A1 * | 8/2008 | Connolly | | 280/759 |

OTHER PUBLICATIONS

Koneta "ProTecta Diamond Series Bedmat" http://www.konetainc.com/lightduty_diamondbedmat.html, pp. 1-3, printed Jan. 13, 2008.

(Continued)

*Primary Examiner* — Paul N Dickson
*Assistant Examiner* — Nicole Verley
(74) *Attorney, Agent, or Firm* — Lathrop & Gage LLP

(57) ABSTRACT

Modular weight systems for improving tire traction of automobiles on road surfaces affected by inclement weather are disclosed. The modular weight systems include a plurality of tiles that are configured to releasably mate to one another, and to fit within the cargo space of a vehicle without significantly reducing utility or becoming dislodged during movement. The tiles generally weigh between twenty and two-hundred pounds each, and they may be filled or doped with heavy filler materials, such as sand, stone or shot.

21 Claims, 5 Drawing Sheets

OTHER PUBLICATIONS

Champion Manufacturing, Inc. "Rubber Matting for Industrial Applications," http://www.champion-manufacturing.com/index.asp, p. 1, printed Jan. 13, 2008.

Stall Mats, Ranch and ATV Equipment, Harrows, Manure Spreaders and Stable Supplies, "Stall Mats, Rubber Flooring & Ranch Equipment" http://www.stallmats.com/, pp. 1-5, printed Jan. 13, 2008.

Stall Mats, Ranch and ATV Equipment, Harrows, Manure Spreaders and Stable Supplies, "Stall Mats, Rubber Flooring & Ranch Equipment" http://www.stallmats.com/products-ranch/mats-horse.htm, pp. 1-2, printed Jan. 13, 2008.

Stall Mats, Ranch and ATV Equipment, Harrows, Manure Spreaders and Stable Supplies, "Stall Mats, Rubber Flooring & Ranch Equipment" http://www.stallmats.com/products-ranch/mats-athletic.htm, pp. 1-2, printed Jan. 13, 2008.

Stall Mats, Ranch and ATV Equipment, Harrows, Manure Spreaders and Stable Supplies, "Stall Mats, Rubber Flooring & Ranch Equipment" http://www.stallmats.com/products-ranch/mats-cow.htm, pp. 1-2, printed Jan. 13, 2008.

Shurtrax, "Shurtrax Added Truck Weight for Better Truck Traction," http://www.shurtrax.com/index.asp, pp. 1-2, printed Jan. 13, 2008.

Shurtrax, "Shurtrax Bed Traction Weight," http://storesense.megawebservers.com/HS2048/Categories.bok?category=Bed+Traction+ . . . , 1-2, printed Jan. 13, 2008.

Iron Company, http://www.ironcompany.com/ProductImages/ironcompany/flooring/playtilezoom2-lg.jpg, printed p. 1, Jan. 13, 2008.

* cited by examiner

MODULAR WEIGHT SYSTEMS FOR AUTOMOBILES

RELATED APPLICATIONS

This application claims the benefit of priority to U.S. Provisional Patent Application Ser. No. 60/885,088, filed Jan. 16, 2007, which is hereby incorporated by reference in its entirety.

BACKGROUND

Due to their design and intended use, a number of vehicles contain a significant amount of empty space (e.g., pick-up trucks, cargo vans, minivans, trailers, 18-wheelers). This empty space creates a weight imbalance that tends to reduce a driver's control on snow and ice. In an attempt to increase traction, many owners of lightweight vehicles place cinder blocks, bricks, sand bags, logs or other heavy items in the cargo space of their vehicles. Not only does this practice reduce the useful area within the vehicle, it also creates a serious risk of injury or death if the items become flying projectiles during an accident or sudden stop. A somewhat safer weighting device is a large rectangular water bladder that may be filled with a garden hose and placed in a trunk of a car or bed of a pick-up truck. However, these bladders contain between 12.5 and 50 gallons of water and weigh between 100 and 400 pounds when full. A puncture of the bladder can therefore release large quantities of water within a trunk or car interior, and removal of an intact bladder may be difficult or impossible when the water within it is frozen. Further, these water bladders have convex top surfaces that are unsuitable for the stable transport of most items.

SUMMARY

The present instrumentalities overcome the problems outlined above by providing modular weight systems for automobiles. The modular weight systems disclosed herein include a plurality of tiles that may be placed in an automobile cargo space. The tiles are configured to be joined together in a releasably mateable fashion so that the weight systems do not obstruct the cargo space or become dislodged during movement.

In an embodiment, a modular weight system for an automobile includes a first tile and a second tile, the first tile and the second tile configured to releasably mate to one another to form the modular weight system. The first tile and the second tile each have a surface area (in inches) to weight (in pounds) ratio of less than 30:1.

In an embodiment, a modular weight system for an automobile includes a first tile and a second tile, the first tile and the second tile configured to releasably mate to one another to form the modular weight system. The first tile and the second tile each weigh at least twenty pounds and have a surface area (in inches) to weight (in pounds) ratio of less than 30:1.

In an embodiment, a method of using a modular weight system to improve automobile traction includes providing a first tile and a second tile, the first tile and the second tile configured to releasably mate to one another to form the modular weight system. The first tile and the second tile each have a surface area (in inches) to weight (in pounds) ratio of less than 30:1. The modular weight system is placed in a cargo space of an automobile.

DETAILED DESCRIPTION

As used herein, the term "automobile" refers to a device for the ground transportation of passengers or cargo, where the device may or may not be independently powered. For example, the term "automobile" may refer to various types of cars, buses, pick-up trucks, flatbed trucks, trailers, 18-wheelers, cargo vans, minivans, SUV's and the like.

As used herein, "mating" of tiles may be accomplished when two or more tiles are sized and shaped to join or fit together in an interconnected and interlocking manner. Interlocking of mated tiles provides a substantially snug fit, such that motion of each tile is constrained relative to the tile(s) with which it is mated, and little or no space exists between the edges of mated tiles. For example, two or more tiles may be mated using interlocking or interdigitated tabs.

Reference will now be made to the attached drawings, where like numbers represent similar elements in multiple figures. Numbering without parentheses is used to denote a genus (e.g., modular weight system 100), whereas numbering with parentheses denotes a species within a genus (e.g., modular weight system 100(2)). Multiple elements within a figure may not be labeled for the sake of clarity.

Figure 1:
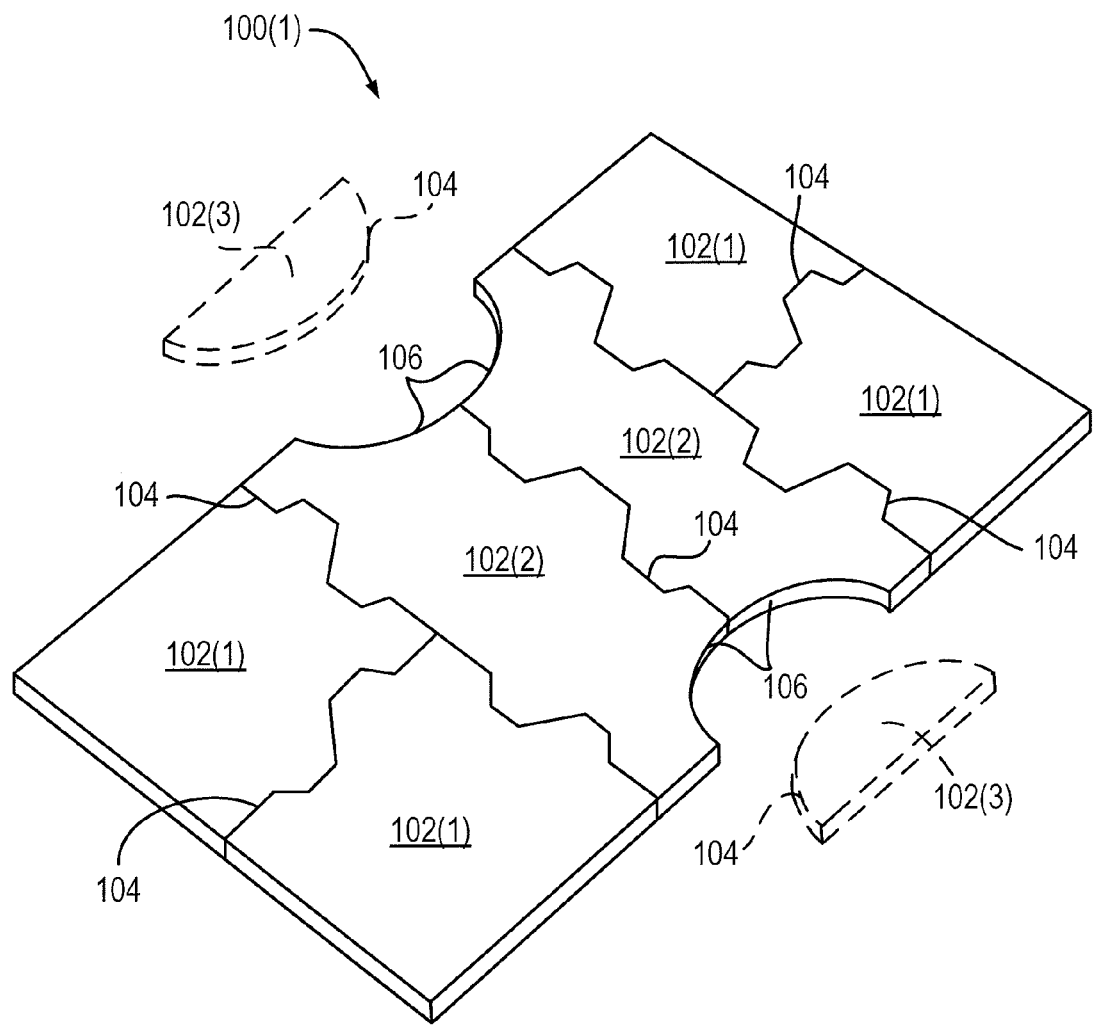
FIG. 1 is a top perspective view of an exemplary modular weight system configured for placement in a bed of a pick-up truck.

FIG. 1 is a top perspective view of an exemplary modular weight system 100(1) configured for placement in a bed of a pick-up truck (not shown). In operation, modular weight system 100(1) is sized and shaped to fit snuggly within the bed of a particular model and brand of truck, thereby minimizing movement of system 100(1) during driving. Modular weight system 100(1) includes a plurality of individual tiles 102(1) and 102(2), which are releasably mated to one another at edges 104 of tiles 102 (e.g., by aligning edges 104 and setting them in place with a rubber mallet). Within system 100(1), tiles 102(1) are configured as corner pieces, and tiles 102(2) are configured as center pieces having cutout portions 106 to accommodate wheel wells of a pick-up truck.

In an alternate embodiment, when it is unnecessary to accommodate wheel wells of an automobile, tiles 102(3) may be aligned with cutout portions 106. In one example, tiles 102(3) may contain interlocking tabs for mating of tiles 102(3) with tiles 102(2). Use of tiles 102(3) converts system 100(1) into a rectangular weight system similar to system 100(2) of FIG. 2.

Although FIG. 1 shows six (or eight) tiles 102, it will be appreciated that various layouts involving two, three, four, five, six, seven, eight, nine, ten or more tiles 102 may be used to create modular weight system 100. Modular weight system 100 may form various regular or irregular shapes without departing from the spirit and scope of what is described herein. Further, tabs 202 (FIG. 2), which are used to releasably mate edges 104 of tiles 102, may be formed in various sizes and shapes.

Figure 2:
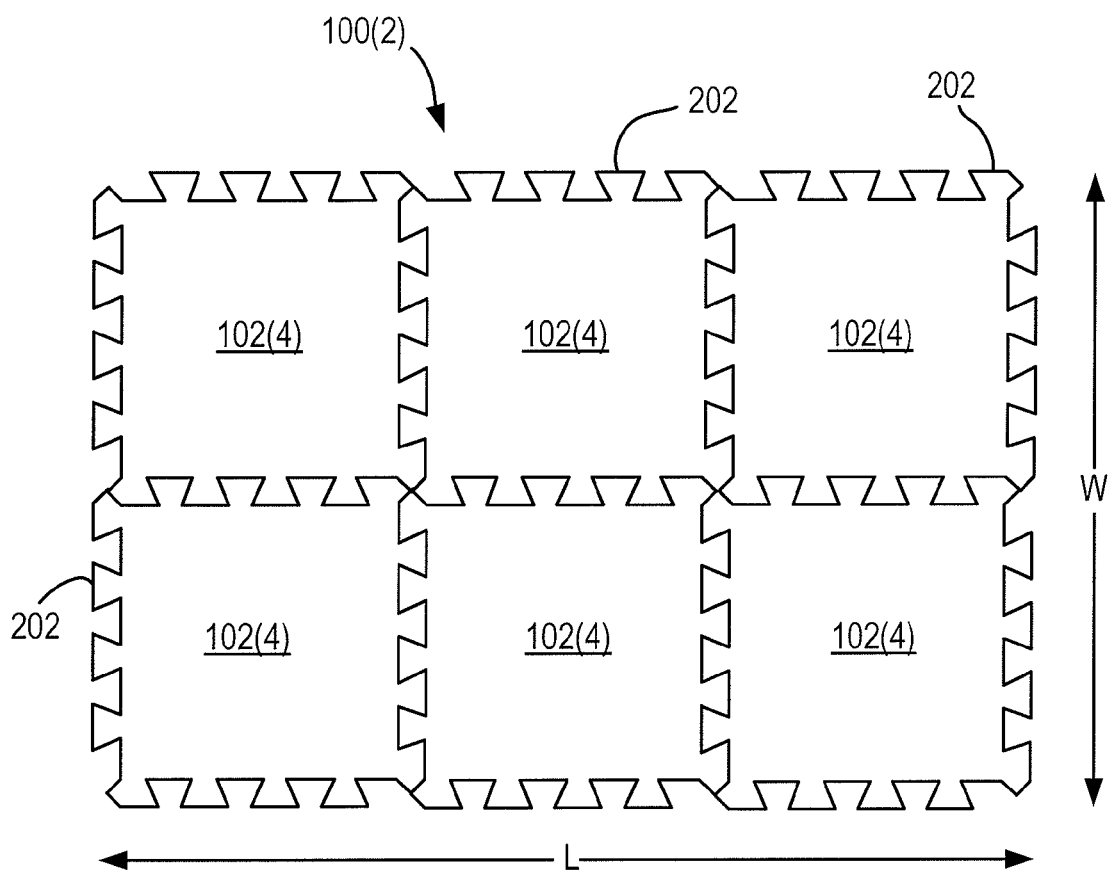
FIG. 2 is a top plan view of an exemplary modular weight system configured for placement in a square or rectangular cargo space of an automobile.

FIG. 2 is a top plan view of one exemplary modular weight system 100(2) configured for placement in a square or rectangular cargo space of an automobile, such as a trunk or trailer. Length, L, and width, W, of system 100(2) may be adjusted to accommodate cargo spaces of various sizes by the addition or subtraction of tiles 102(4). As discussed above, tiles 102(3) may be used to convert system 100(1) into a rectangular system such as system 100(2). In another embodiment, tiles 102(1) of FIG. 1 may be joined directly to form a square or rectangular system such as system 100(2).

In general, tiles 102 have substantially flat top and bottom surfaces, which provide for the stable transport of most items, and the tiles are generally fabricated from chemically inert and durable material(s). Tiles 102 may, for example, be fabricated from metal, rubber, plastic (e.g., polyurethane) or a combination thereof (e.g., silicon rubber coated metal). Rubber or plastic tiles 102 may be fabricated using well known extrusion and injection molding procedures, whereas metal tiles 102 may be created using known metal working or melt casting techniques.

In an embodiment, use of materials which are resistant to ultraviolet radiation (UV) may decrease a rate of decomposition of a modular weight system that experiences extended sun exposure (e.g., in an open pick-up truck). UV resistant material may be used to form a monolithic tile 102, or it may be used as a coating disposed around tile 102.

In an embodiment, a tile 102 may be fabricated, at least in part, from a magnetic material, such as stainless steel, ceramic or iron oxide, $Fe_3O_4$. Magnetic attraction between the tile and body of the automobile may help to immobilize the tile(s) during automobile movement. For example, a surface of tile 102 intended to contact the automobile may be fabricated of stainless steel, and other surfaces, e.g., top and/or side surfaces, may be coated with a plastic, rubber or UV coating. In another embodiment, the magnetic field associated with a magnetic material may be sufficient to penetrate a coating that covers the entirety of tile 102.

The weight of each tile 102 is, for example, between 20-200 pounds, preferably between 40-100 pounds, and most preferably between 50-80 pounds. For personal vehicles, it is desirable that tiles 102 each weigh an amount that an average, healthy adult can lift without strain or injury. For commercial vehicles, heavier tiles may be used and, if necessary, the tiles may be placed in a cargo space using machinery (e.g., a fork lift). Modular weight systems 100 typically weigh between 40-2000 pounds, preferably between 100-1000 pounds, and most preferably between 200-800 pounds.

Generally, each tile 102 has a width of about 24-75 inches, a length of about 24-75 inches, and a height or thickness of about 1-4 inches. Tiles 102 typically have a ratio of surface area (in inches) to weight (in pounds) that is less than 30:1, preferably between 2.5:1 to 25:1, more preferably between 3.5:1 to 15:1, and most preferably between 4.5:1 to 10:1.

The weight of each tile 102 may be controlled by appropriate selection of the fabrication material(s). In an embodiment, tile 102 may be formed as a monolithic mass where the physical weight of the fabrication material may be sufficient to improve automobile traction. In another embodiment, tile 102 may be filled or doped with a heavy filler material, such as sand, stone or shot. When the filler material is stone or shot, for example, the material may have a diameter between 0.1 and 1 inch, preferably between 0.1 and 0.5 inches. Additionally, a coating may be disposed around a monolithic tile, a filled tile, or a doped tile to maintain integrity and/or increase durability of the tile. For example, tile 102 may comprise a monolithic steel plate coated with rubber.

Figure 3:
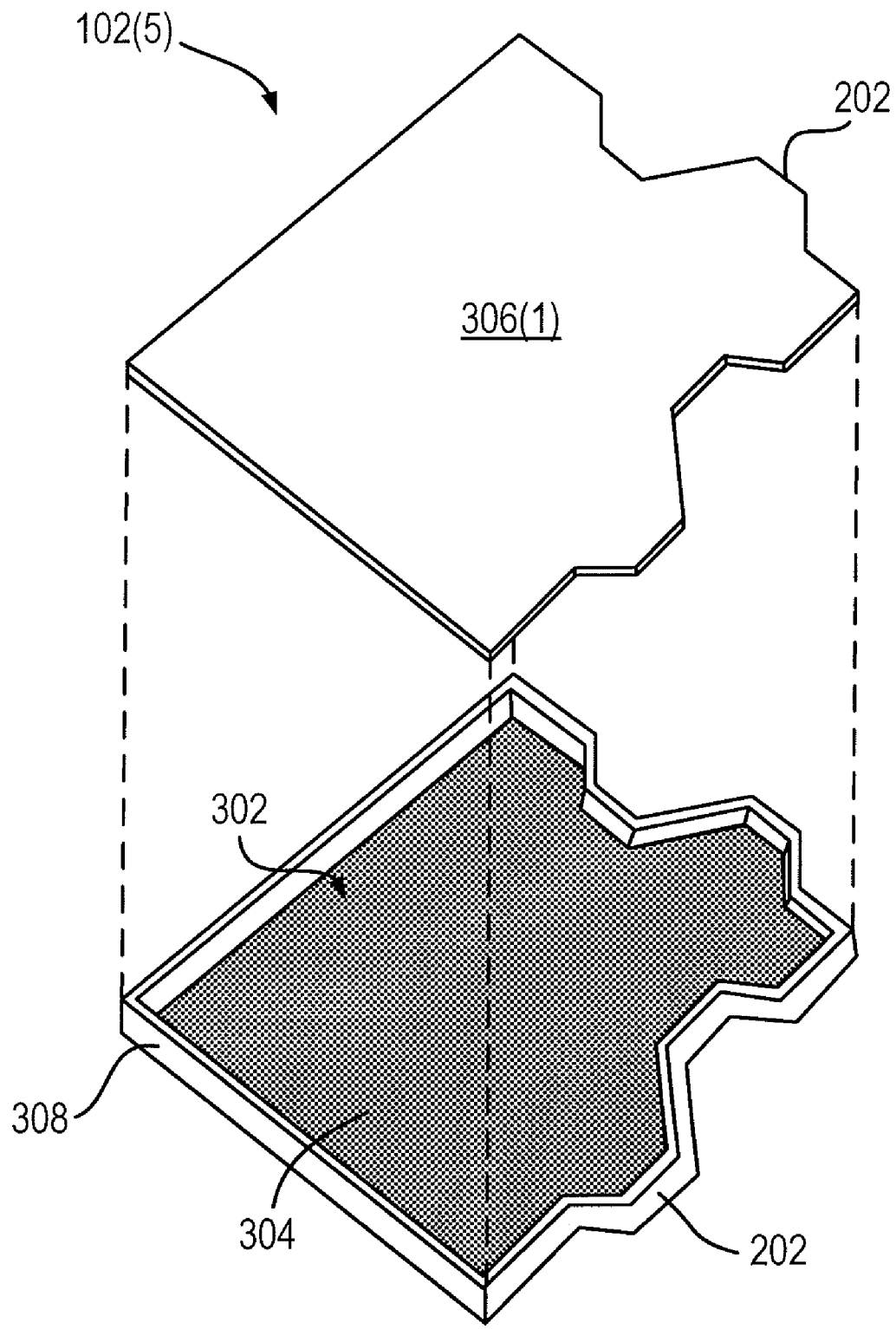
FIG. 3 is a top perspective view of a tile having an internal cavity, according to an embodiment.

FIG. 3 is a top perspective view of a tile 102(5) having an internal cavity 302 for receiving filler material 304. Following insertion of filler material 304 into cavity 302, a lid 306(1) may be factory bonded or glued to a base 308. Alternatively, cavity 302 may be filled by an end user and lid 306(1) may securely, and optionally releasably, mate with base 308. In an embodiment, a latching and/or locking mechanism may be used to secure lid 306(1) to base 308. In another embodiment, epoxy may be used to permanently mate lid 306(1) and base 308. As described above with respect to FIG. 2, tabs 202 may releasably mate edges of one tile 102(5) with an adjacent tile 102(5).

Figure 4:
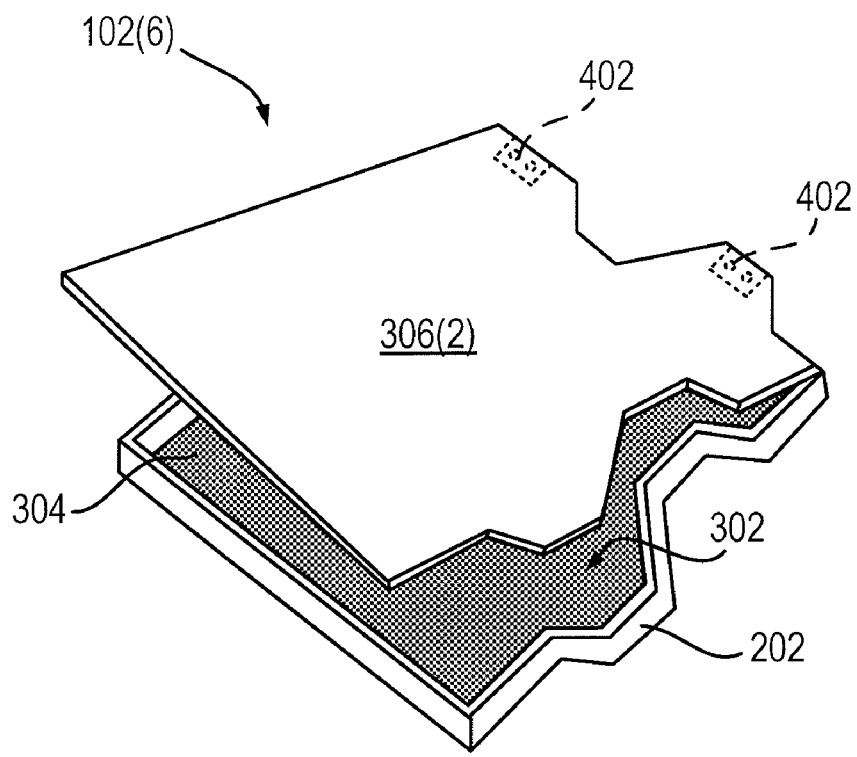
FIG. 4 is a top perspective view of a tile having an internal cavity and a hinged lid, according to an embodiment.

FIG. 4 is a top perspective view of a tile 102(6) having an internal cavity 302 and hinged lid 306(2). In addition to one or more hinges 402, tile 102 may contain a latching and/or locking mechanism to secure filler material 304 within tile 102(6).

Figure 5:
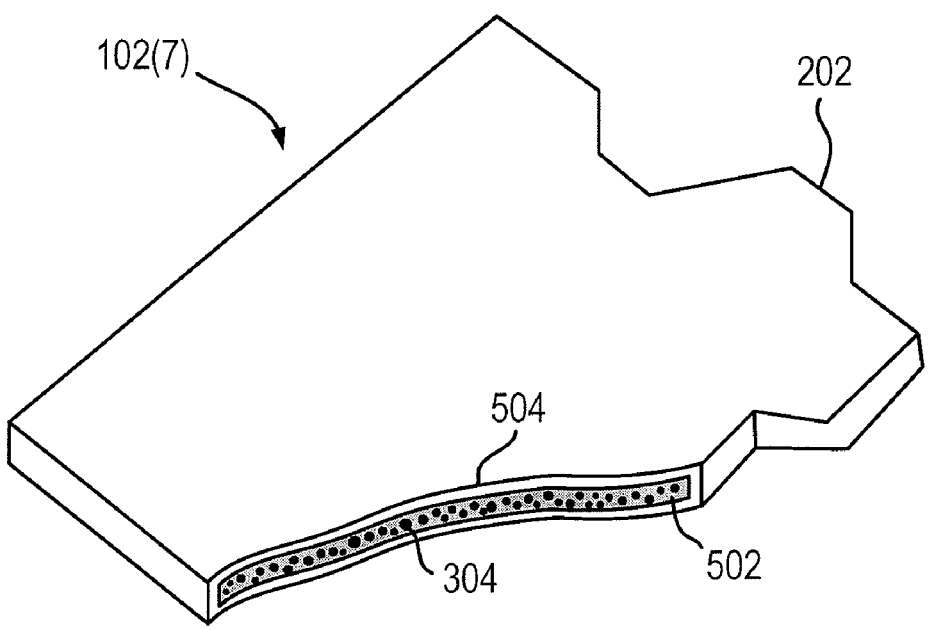
FIG. 5 is a partial cutaway view of a tile having a doped inner material and an outer coating, according to an embodiment.

In another example, filler material 304 may be distributed throughout the fabrication material. FIG. 5 is a partial cut-away view of one tile 102(7) having a doped inner material 502 and an outer coating 504. For example, inner material 502 may be rubber doped with a filler material 304 (e.g., steel shot), which is then encased within a coating 504 of silicone rubber. In another embodiment, inner material 502 and coating 504 may be formed of the same fabrication material (e.g., rubber) except that inner material 502 may be doped and coating 504 may not contain filler material. In yet another embodiment, inner material 502 may be doped with a fine grain filler material 304, such as sand, and coating 504 may not be present.

Figure 6:
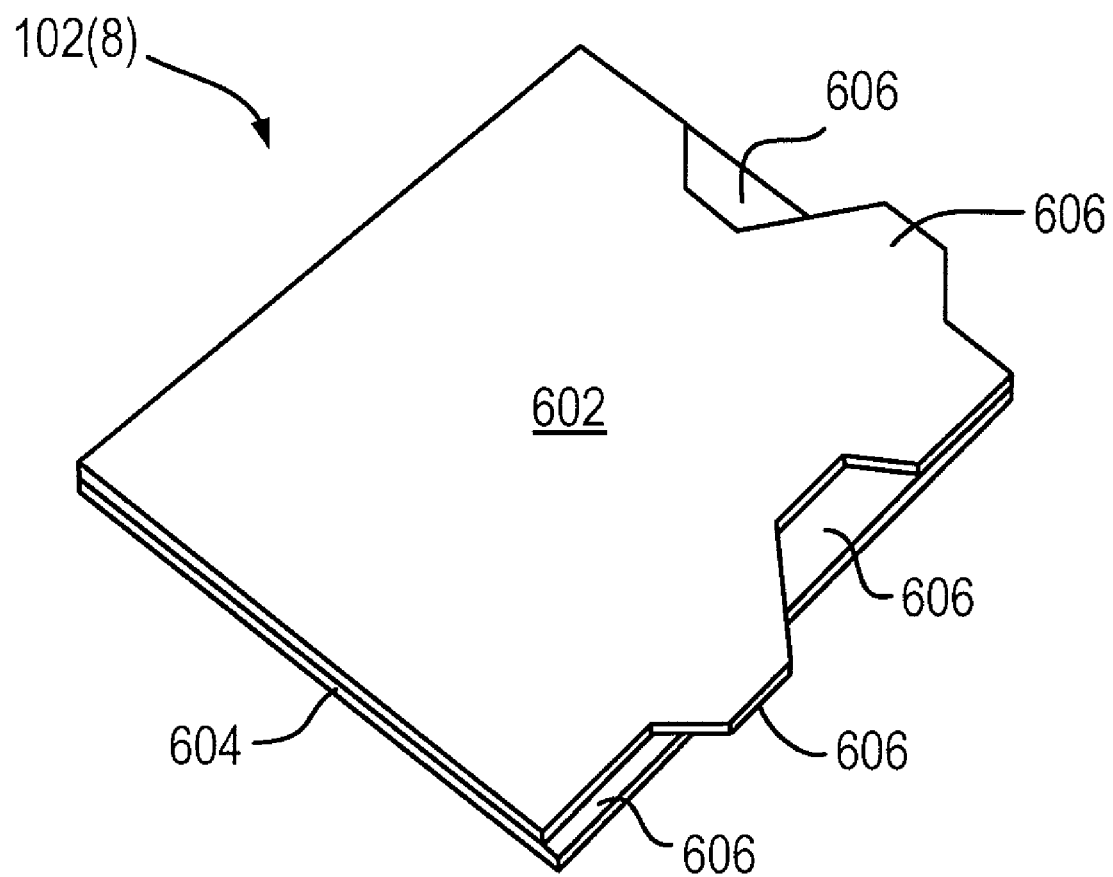
FIG. 6 is a top perspective view of a tile including a top portion and a bottom portion that are bonded together.

FIG. 6 is a top perspective view of a tile 102(8) having a top portion 602 and a bottom portion 604 that are permanently or semi-permanently bonded together. For example, top and bottom portions 602, 604 may be bonded together using epoxy, rubber cement, glue, caulk, welding material or another bonding material known in the art. Although FIG. 6 shows tile 102(8) containing only two portions 602 and 604, it will be appreciated that tile 102(8) may alternatively include three, four, five, ten, twenty or more portions.

In an embodiment, top portion 602 and bottom portion 604 may be similarly shaped so that there are no overhanging parts when portions 602 and 604 are aligned and bonded. In another embodiment (shown in FIG. 6), top portion 602 and bottom portion 604 have different shapes, and one or more overhanging parts 606 exist. It will be appreciated that a second tile 102(8)' (not shown) that is configured to be joined with tile 102(8) will have an arrangement of overhanging parts 606 that is complementary to that of tile 102(8). Tiles 102(8) and 102(8)' may therefore be interdigitated or interlocked along a vertical axis defined by the thickness of a tile 102. Interdigitation along the vertical axis, as well as along the lateral and longitudinal axes (FIG. 2, L and W) using tabs 202, provides improved stability during vehicle movement.

In one example, one or more overhanging parts 606 of tile 102(8) may be bonded to one or more complementary overhanging parts 606' of tile 102(8)'. Bonding of the overhanging parts 606, 606' may be permanent, semi-permanent or temporary. For example, temporary bonding may be accomplished using Velcro®, magnets, reusable adhesives and/or other means known in the art.

Changes may be made in the above systems and methods without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present systems and methods, which, as a matter of language, might be said to fall there between.

What is claimed is:

1. A modular weight system for an automobile, comprising:
   a first solid tile and a second solid tile, the first tile and the second tile fabricated from rubber and configured to releasably mate to one another (a) along a vertical axis defined by the tile thickness and (b) along a non-linear interface therebetween and orthogonal to the vertical axis to, constrain horizontal displacement of the first solid tile and the second solid tile;
   wherein each corner of the first tile and each corner of the second tile is configured for releasably mating with adjacent tiles; and
   wherein a plurality of first tabs spans at least one side of the first tile and a plurality of second tabs spans at least one side of the second tile, the first and second tabs configured for interlocking with one another to mate the first and second tiles together.

2. The system of claim 1, further comprising a coating disposed around one or both of the first tile and the second tile.

3. The system of claim 1, one or both of the first tile and the second tile comprising a magnetic material.

4. The system of claim 3, the magnetic material enhancing stabilization of the tile within the cargo area through magnetic attraction between the magnetic material and metal of the cargo area.

5. The system of claim 1, each tile weighing at least 20 pounds.

6. The system of claim 1, each tile weighing between 50 and 80 pounds.

7. The system of claim 1, further including a third tile and a fourth tile for releasably mating with one another, with the first tile or with the second tile, each of the third and fourth tiles having cut-outs shaped to accommodate wheel wells within the cargo area.

8. The system of claim 7, each of the first, second, third and fourth tiles having tabs along at least two sides.

9. The system of claim 8, the tabs selected from the group of interlocking tabs and interdigitating tabs.

10. The system of claim 1, wherein the first tile and the second tile each have a surface area (in inches) to weight (in pounds) ratio of less than 30:1.

11. A modular weight system for an automobile, comprising:
   a first solid tile and a second solid tile, the first tile and the second tile fabricated from rubber and configured to releasably mate to one another (a) along a vertical axis defined by the tile thickness and (b) along a non-linear interface therebetween and orthogonal to the vertical axis, to constrain horizontal displacement between the first solid tile and the second solid tile;
   each side of the first tile and each side of the second tile comprising a plurality of tabs spanning a length of the side; wherein adjacent tabs of the first tile form therebetween a recess for accepting a tab of the second tile, and wherein adjacent tabs of the second tile form therebetween a recess for accepting a tab of the first tile; and
   wherein each corner of the first tile and each corner of the second tile is configured to interlock with adjacent tiles.

12. The modular weight system of claim 11, one or both of the first tile and the second tile comprising a magnetic material.

13. The system of claim 11, the tabs of the first tile and the tabs of the second tile extending laterally from a top surface of the respective tile with the recesses disposed between the tabs; the tabs and recesses being coplanar with a top surface of the tile; the tabs and recesses of the first tile configured for mating with complementary recesses and tabs of the second tile to secure the first and second tiles together.

14. The system of claim 11, further including a third tile and a fourth tile for releasably mating (a) with one another, (b) with the first tile or (c) with the second tile, each of the third and fourth tiles having cut-outs shaped to accommodate wheel wells within the cargo area.

15. A method of using a modular weight system to improve automobile traction, comprising:
   providing a first monolithic tile and a second monolithic tile, the first tile and the second tile fabricated from rubber and configured to releasably mate to one another (a) via a plurality of interlocking tabs spanning an entire length of at least one side of the first tile and an entire length of at least one side of the second tile; (b) along a vertical axis defined by the tile thickness and (c) along a non-linear interface therebetween and orthogonal to the vertical axis, to constrain horizontal displacement between the first solid tile and the second solid tile; and
   placing the first and second tiles in a cargo space of an automobile;
   aligning the tabs of the first tile with recessess formed between adjacent tabs of the second tile; and
   joining the tiles together via the tabs and recesses.

16. A modular weight system for an automobile cargo area, comprising:
   a plurality of flat, rubber tiles configured to releasably mate with one another (a) via a plurality of interlocking mating features spanning an entire length of at least one side of the first tile and an entire length of at least one side of the second tile; (b) along a vertical axis defined by the tile thickness and (c) along a non-linear interface therebetween and orthogonal to the vertical axis, to constrain horizontal displacement between a first flat, rubber tile and a second flat, rubber tile, to form a weighted base for the automobile cargo area; each tile weighing at least twenty pounds;
   wherein two of the plurality of tiles include cut-outs shaped to accommodate wheel wells of the cargo area.

17. The system of claim 16, the mating features selected from the group of interlocking tabs and interdigitating tabs.

18. The system of claim 17, the mating features comprising interlocking tabs having intervening recesses therebetween, the tabs and recesses being coplanar with a top surface of the tile.

19. The system of claim 17, the tabs of each tile having a thickness equal to the thickness of the tile.

20. The system of claim 16, each tile having a top tier and a bottom tier formed therewith; the mating features comprising a plurality of tabs and recesses formed with the top tier for mating with complimentary recesses and tabs formed with an adjacent tile, such that each tab overlies a portion of the bottom tier and each recess underlies a tab when the tiles are connected.

21. The system of claim 16, the tiles being solid rubber tiles.

* * * * *